United States Patent Office 3,576,743
Patented Apr. 27, 1971

3,576,743
LUBRICANT AND FUEL ADDITIVES AND
PROCESS FOR MAKING THE ADDITIVES
Robert Widmer, Painesville, and Norman A. Meinhardt,
Lyndhurst, Ohio, assignors to The Lubrizol Corporation, Wickliffe, Ohio
No Drawing. Filed Apr. 11, 1969, Ser. No. 815,484
Int. Cl. C10m 1/32; C10l 1/22
U.S. Cl. 252—51.5
12 Claims

ABSTRACT OF THE DISCLOSURE

Oil-soluble composition produced by reacting at least one high molecular weight polycarboxylic acid acylating agent with at least one equivalent of a polyhydric alcohol to form a first reaction mixture which is then contacted with a hydroxy-substituted primary amine. The resulting products are useful primarily as lubricant and fuel additives. An oil-soluble composition prepared by reacting polyisobutenyl-succinic anhydride with a polyhydric lower alkanol to form a first reaction mixture which is then contacted with trismethylolaminomethane is representative.

---

This invention relates to novel oil-soluble compositions, processes for their preparation, and lubricants and fuels containing these compositions. Particularly, the invention is concerned with novel oil-soluble compositions especially useful in lubricants and fuels and generally characterized by improved performance. These oil-soluble compositions are produced by reacting certain polycarboxylic acid acylating agents with polyhydric alcohols to produce a first reaction product and subsequently treating this first reaction product with a hydroxy-substituted primary amine.

It is known to prepare oil-soluble ester-containing additives by reacting high molecular weight carboxylic acid acylating agents with alcohols under esterification conditions. For example, see U.S. Pats. 3,331,776; 3,346,354; 3,381,022. Generally, if the alcohol reactant is polyhydric, the reaction product is an oil-soluble composition containing a complex mixture of esters and possibly some unreacted starting materials. This reaction product is then employed alone or in combination with other additives in lubricants and fuels where they disperse sludges, neutralize corrosion-causing combustion products, promote fuel and exhaust system cleanliness, or otherwise improve the performance of the lubricant or fuel composition. It has now been determined that subsequently contacting the reaction products with at least one hydroxy-substituted primary amine results in improved performance.

Accordingly, the principal objects of this invention include the provision of novel oil-soluble compositions, processes for their preparation, and lubricants and fuels containing them.

These as well as other obvious and inherent objects of this invention can be achieved by providing oil-soluble compositions prepared by reacting under esterification conditions (A) at least one substituted polycarboxylic acid acylating agent containing an average of at least about 30 aliphatic carbon atoms per substituent with (B) at least one polyhydric alcohol in amounts such that there is at least one equivalent of polyhydric alcohol for each equivalent of substituted carboxylic acid acylating agent to form an ester-containing first reaction mixture and thereafter intimately contacting this first reaction mixture with (C) from about 0.025 to about 0.15 equivalent of at least one hydroxy-substituted primary amine per equivalent of (A). The lubricants and fuels contemplated herein are readily prepared by incorporating oil-soluble compositions thus produced into a lubricant or fuel in the presence or absence of additional additives.

The substituted polycarboxylic acid acylating agents, that is, reactant (A), are either well-known or can be readily prepared by procedures known in the art such as those described in U.S. Pats. 3,018,291; 3,172,892; 3,219,-666; 3,272,746; 3,331,776; 3,341,542; 3,346,354; and 3,381,022 which are hereby incorporated herein. The acylating agents should contain at least about 30 aliphatic carbon atoms in the substituents. This limitation is based upon both oil-solubility considerations and the effectiveness of the compositions as additives in lubricants and fuels. Preferably, the substituent will contain at least about fifty aliphatic carbon atoms in the substituents if they are to be used in lubricants. Another important characteristic of the acylating agent is that it preferably should be substantially saturated, i.e., at least about 95% of the total number of the carbon-to-carbon covalent linkages therein should be saturated linkages. In an especially preferred aspect of the invention, at least about 98% of these covalent linkages are saturated. Obviously, all may be saturated. A greater degree of unsaturation renders the products prepared therefrom more susceptible to oxidation, degradation, and polymerization and this lessens their effectiveness as lubricant and fuel additives.

In addition, the acylating agents should be substantially free from oil-solubilizing pendant groups, that is, groups having more than about six aliphatic carbon atoms. Although, some such oil-solubilizing pendant groups may be present, they preferably will not exceed one such group for every twenty-five aliphatic carbon atoms in the principal hydrocarbon chain of the acylating agent. The acylating agent may contain polar substituents. Typical polar substituents are halo, such as chloro and bromo, oxo, oxy, formyl, sulfonyl, sulfinyl, thio, nitro, etc. Such polar substituents, if present, preferably will not exceed 10% by weight of the total weight of the hydrocarbon portion of the carboxylic acid radical excluding the weight of the carboxylic acid groups, e.g.,

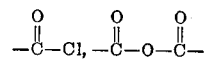

etc.

As disclosed in the foregoing patents, there are several processes for preparing the acylating agents. Generally, these processes involves the reaction of (1) an ethylenically unsaturated carboxylic acid, acid halide, anhydride, or equivalent acidic reactant with (2) an ethylenically unsaturated hydrocarbon containing at least about 30 aliphatic carbon atoms or a chlorinated hydrocarbon containing at least 30 aliphatic carbon atoms at a temperature within the range of about 100°–300° C. The chlorinated hydrocarbon or ethylentically unsaturated hydrocarbon reactant can, of course, optionally contain polar substituents, oil-solubilizing pendant groups, and be unsaturated within the general limitations explained herein above and in the incorporated patents. The acidic reactant usually corresponds to the formula $R_o$—$(COOH)_n$, where $R_o$ is characterized by the presence of at least one ethylenically unsaturated carbon-to-carbon covalent bond and $n$ is an integer from two to six and preferably two. The acidic reactant can also be the corresponding carboxylic acid halide, anhydride, ester, or other equivalent acylating agent and mixtures of one or more of these. Ordinarily, the total number of carbon atoms in the acidic reactant will not exceed ten and generally will not exceed six. Preferably the acidic reactant will have at least one ethylenic linkage in an $\alpha,\beta$-position with respect to at least one carboxyl function. Exemplary acidic reactants are maleic acid, maleic anhydride, fumaric acid, itaconic acid, itaconic anhydride, citraconic acid, citraconic anhydride, mesaconic acid, glutaconic acid, chloromaleic acid, aconitic acid, and the like.

As is apparent from the foregoing, the carboxylic acid acylating agents may contain cyclic and/or aromatic groups. However, the acids are essentially aliphatic in nature and in most instances, the preferred acylating agents are aliphatic polycarboxylic acids, anhydrides, and halides.

Substituted succinic acid acylating agents, especially substantially saturated aliphatic hydrocarbon-substituted succinic acids and anhydrides are preferred as acylating agents in the preparation of the mixed esters of the present invention. These succinic acid acylating agents are readily prepared by reacting maleic anhydride with a high molecular weight olefin or a chlorinated hydrocarbon such as a chlorinated polyolefin. The reaction involves merely heating the two reactants at a temperature of about 100°–300° C., preferably, 100°–200° C. The product from such a reaction is a substituted succinic anhydride where the substituent is derived from the olefin or chlorinated hydrocarbon as described in the above cited patents. The product may be hydrogenated ot remove all or a portion of any ethlenically unsaturated covalent linkages by standard hydrogenation procedures, if desired. The substituted succinic anhydrides may be hydrolyzed by treatment with water or steam to the corresponding acid.

The ethylenically unsaturated hydrocarbon reactant and the chlorinated hydrocarbon reactant used in the preparation of the acylating agents are principally the high molecular weight, substantially saturated petroleum fractions and substantially saturated olefin polymers and the corresponding chlorinated products. The polymers and chlorinated polymers derived from mono-olefins having from two to about thirty carbon atoms are preferred. Especially useful are the polymers and chlorinated polymers of 1-mono-olefins such as ethylene, propene, 1-butene, isobutene, 1-hexene, 1-octene, 2-methyl-1-heptene, 3-cyclohexyl-1-butene, and 2-methyl-5-propyl-1-hexene. Polymers of medial olefins, i.e., olefins in which the olefinic linkage is not at the terminal position, likewise are useful. These are exemplified by 2-butene, 3-pentene, and 4-octene.

The interpolymers of 1-mono-olefins such as illustrated above with each other and with other interpolymerizable olefinic substances such as aromatic substituted olefins, cyclic olefins, and polyolefins, are also useful sources of the ethylenically unsaturated reactant. Such interpolymers include for example, those prepared by polymerizing isobutene with styrene, isobutene with butadiene, propene with isoprene, propene with isobutene, ethylene with piperylene, isobutene with chloroprene, isobutene with p-methyl-styrene, 1-hexene with 1,3-hexadiene, 1-octene with 1-hexene, 1-heptene with 1-pentene, 3-methyl-1-butene with 1-octene, 3,3-dimethyl-1-pentene with 1-hexene, isobutene with styrene and piperylene, etc.

The chlorinated hydrocarbons and ethylenically unsaturated hydrocarbons used in the preparation of the acylating agents can have molecular weights of from about 700 up to about 100,000 or even higher. When the acylating agent has a molecular weight in excess of about 10,000, the acylated nitrogen composition also possess viscosity index improving qualities. The preferred materials for preparing the acylating agents are the above-described polyolefins and chlorinated polyolefins having an average molecular weight of about 700 to about 5,000.

In lieu of the high molecular weight hydrocarbons and chlorinated hydrocarbons discussed above, hydrocarbons containing activating polar substituents which are capable of activating the hydrocarbon molecule in respect to reaction with an ethylenically unsaturated acid reactant may be used in the above-illustrated reactions for preparing the acylating agents. Such polar substituents include sulfide and disulfide linkages, and nitro, mercapto, carbonyl, and formyl radicals. Examples of these polar-substituted hydrocarbons include polypropene sulfide, di-polyisobutene disulfide, nitrated mineral oil, de-polyethylene sulfide, brominated polyethylene, etc.

The acylating agents may also be prepared by halogenating a high molecular weight hydrocarbon such as the above described olefin polymers to produce a polyhalogenated product, converting the poly-halogenated product to a poly-nitrile, and then hydrolyzing the poly-nitrile. They may be prepared by oxidation of a high molecular weight polyhydric alcohol with potassium permanganate, nitric acid, or a similar oxidizing agent. Another method for preparing polycarboxylic acid acylating agents involves the reaction of an olefin or a polar-substituted hydrocarbon such as a chloropolyisobutene with an unsaturated polycarboxylic acid such as 2-pentene-1,3,5-tricarboxylic acid prepared by dehydration of citric acid.

Polycarboxylic acid acylating agents can also be obtained by reacting chlorinated polycarboxylic acids, anhydrides, acyl halides, and the like with ethylenically unsaturated hydrocarbons or ethylenically unsaturated substituted hydrocarbons such as the polyolefins and substituted polyolefins described hereinbefore in the manner described in 3,340,281.

Polycarboxylic acid anhydrides are obtained by dehydrating the corresponding acids. Dehydration is readily accomplished by heating the acid to a temperature above about 70° C., preferably in the presence of a dehydration agent, e.g., acetic anhydride. Cyclic anhydrides are usually obtained from polycarboxylic acids having acid radicals separated by no more than three carbon atoms such as substituted succinic or glutaric acid, whereas linear anhydrides are obtained from polycarboxylic acids having the acid radicals separated by four or more carbon atoms. The acid halides of the polycarboxylic acids can be prepared by the reaction of the acids or their anhydrides with a halogenating agent such as phosphorus tribromide, phosphorus pentachloride, or thionyl chloride in the conventional manner.

The polyhydric alcohols useful as reactants (B) can be quite diverse and include those polyhydric alcohols disclosed in U.S. Pats. 3,331,776; 3,346,353; and 3,381,022 patents which are incorporated herein by reference. Among the suitable polyhydric alcohols are the alkylene glycols and the polyalkylene glycols wherein the alkylene groups have up to about seven carbon atoms and up to about twenty alkylene groups; cycloaliphatic alcohols; aromatic hydrocarbon-substituted alcohols; and various other substituted polyhydric alcohols including mixtures of these alcohols. Specific examples of the polyhydric alcohols contemplated by this invention are ethylene glycol, propylene glycol, trimethylene glycol, butylene glycol, diethylene glycol, triethylene glycol, tetraethylene glycol, dipropylene glycol, tripropylene glycol, dibutylene glycol, tributylene glycol, 9,10-dihydroxy stearic acid and its lower alkyl esters such as the ethyl ester, $\beta,\beta'$-dihydroxyethylsulfide, 3-chloro-1,2-propanediol, 1,2-butanediol, 2,3-hexanediol, pinacol, 1,4 - dihydroxy-2-nitro-butane, p-xyleneglycol, di-(2-hydroxyethyl)-amine, tri-(2 - hydroxypropyl)-amine, N,N'-di(hydroxyethyl)-ethylenediamine, N,N-di(2 - hydroxyethyl)-glycine and the lower alkyl esters thereof, N,N,N',N'-tetrakis-(2 - hydroxypropyl)-ethylenediamine, N,N,N',N'-tetrakis(2 - hydroxyethyl)-ethylenediamine, 2 - (1-hydroxybutyl)-cyclohexanol, 4-(1,2 - dihydroxyl-n-propyl)-cyclohexanol, $\alpha$-dimethylether of inositol, inositol, 2,2,6,6 - tetrakis-(hydroxymethyl)-cyclohexanol, 1,2 - dicyclohexyl-1,2-ethanediol, 1,2-diphenyl - 1,2 - ethanediol, phenylethylene glycol, 2,3-diphenyl-2,3-butanediol, dipentaerythritol, and the like.

Preferably, however, reactant (B) will be a polyhydric aliphatic alcohol containing at least three hydroxyl groups and up to about twelve aliphatic carbon atoms. In addition to those of the above identified alcohols which fall within this preferred class, other alcohols representative thereof are pantothenyl alcohol, N-methylglucamine, alpha-methylglucoside, mannose, maltose, glucose, gluconic acid, and is lower alkyl esters, and the like. Within this preferred group of polyhydric aliphatic alcohols, an especially preferred class of alcohols are the polyhydric lower alkanols having from three to six hydroxyl groups and up to seven carbon atoms. The especially preferred class of polyhydric alcohols is illustrated by glycerol, β-hydroxymethyl-2-methyl-propanediol-1,3 (i.e., trimethylolethane or TME), 2-hydroxymethyl-2-ethyl-propanediol-1,3 (i.e., trimethylolpropane or TMP), 1,2,4-butanetriol, 1,2,6 - hexanetriol, 1,2,3-pentanetriol 1,2,3-hexanetriol 1,2,4 - hexanetriol, 1,2,5-hexanetriol 2,3,4-hexanetriol, erythritol, pentaerythritol, arabitol, xylitol, adonitol sorbitol, mannitol, and the like. Obviously mixtures of the preferred alcohols can also be used as reactant (B).

The hydroxy-substituted primary amines useful as (C) correspond to the general formula $R_a$—$NH_2$ where $R_a$ is a monovalent organic radical containing at least one alcoholic hydroxyl group, an alcoholic hydroxyl group being one not attached to a carbon atom forming part of an aromatic nucleus. Ordinarily the total number of carbon atoms in $R_a$ will not exceed about twenty. Hydroxy-substituted aliphatic primary amines containing a total of up to about ten carbon atoms are particularly useful. Especially preferred are the polyhydroxy-substituted alkanol primary amines wherein there is only one amino group present (i.e., a primary amino group) having one alkyl substituent containing up to ten carbon atoms and up to six hydroxyl groups. These alkanol primary amines correspond to $R_a$—$NH_2$ where $R_a$ is a mono- or polyhydroxy-substituted alkyl group. It is desirable that at least one of the hydroxyl groups be a primary alcoholic hydroxyl group. Trismethylolaminomethane is the single most preferred hydroxy-substituted primary amine. In addition to the alcoholic hydroxyl substituents, $R_a$ can contain other primary or secondary amino substituents, e.g., lower alkyl amino groups, di-lower alkyl amino groups, hydroxy-substituted lower alkyl amino groups, di(hydroxy-substituted)-lower alkyl amino groups, etc. Moreover R can contain one or more interrupting groups such as

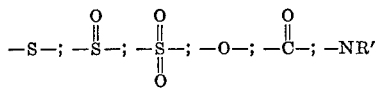

where R' is hydrogen or lower alkyl;
and —NR"— where R" is a group of the formula

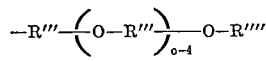

where R''' is alkylene of up to seven carbon atoms and R'''' is hydrogen, lower alkyl, or hydroxy lower alkyl. Such hydroxy-substituted primary amines are known to those skilled in the art or can be prepared according to conventional procedures known in the art.

Illustrative examples of hydroxy-substituted primary amines include 2-amino-1-butanol, 2-amino-2-methyl-1-propanol, p - (β - hydroxyethyl)-aniline, 2-amino-1-propanol, 3-amino-1-propanol, 2-amino-2-methyl-1,3-propanediol, 2 - amino - 2 - ethyl-1,3-propanediol, N-(β-hydroxypropyl)-N'-(β-aminoethyl)-piperazine, tris(hydroxymethyl)aminomethane (also known as trismethylolaminomethane), 2 - amino - 1 - butanol, ethanolamine, β-(β-hydroxyethoxy)-ethylamine, glucamine, glucosamine, 4-amino-3-hydroxy-3-methyl-1-butene (which can be prepared according to procedures known in the art by reacting isopreneoxide with ammonia), N-(3-aminopropyl)-4-(2-hydroxyethyl)-piperidine, 2 - amino - 6 - methyl-6-heptanol, 5 - amino - 1 - pentanol, N-(β-hydroxyethyl)-1,3-diamino propane, 1,3-diamino-2-hydroxy-propane, N-(β-hydroxyethoxyethyl)-ethylenediamine, and the like. Mixtures of these or similar amines can also be employed as reactant (C).

As previously mentioned, the oil-soluble compositions of this invention are prepared by first reacting at least one substituted polycarboxylic acid acylating agent with at least one polyhydric alcohol under conventional esterification conditions to form an ester-containing first reaction mixture. Because the carboxylic acid acylating agent and the polyhydric alcohol each have at least two functional groups capable of entering into the esterification reaction, the ester-containing reaction mixture is generally comprised of a mixture of various esters. Obviously, the more of these functional groups present, the more complex this reaction-mixture becomes with respect to the various type of ester-products which it contains. For purposes of this invention, the specific composition of the first reaction mixture with respect to its complex ester content is not critical to the invention. It should be pointed out, however, that these complex esters are themselves useful as additives in lubricants and fuels without contacting them with the hydroxy-substituted primary amines.

The acylating agents and polyhydric alcohols are reacted in amounts such that the total amounts of acylating agent and polyhydric alcohols employed provides at least one equivalent of polyhydric alcohol for each equivalent of carboxylic acid acylating agent. For purposes of this invention, the number of equivalents of acylating agent corresponds to the number of carboxy groups or equivalent functional variations thereof (e.g.,

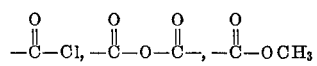

etc.) present in the acylating agents. Thus, one mole of a polyisobutenyl-substituted succinic acid or its anhydride, or halide, has two equivalents per mole. A tricarboxylic acid acylating agent would have three equivalents per mole. Obviously, if a mixture of polycarboxylic acids is employed, the number of equivalents will depend on the particular polycarboxylic acid acylating agents used and the amount of each. Similarly, the number of equivalents of polyhydric alcohol is based on the number of alcoholic hydroxy groups present therein. For example, ethylene glycol and triethylene glycol each have two equivalents per mole; glycerol, three; pentaerythritol, four; and sorbitol, six.

While the acylating agents and the polyhydric alcohols are reacted in at least stoichiometric amounts, it is contemplated that the ester-containing reaction mixture may comprise acidic esters as well as some unreacted acylating agent. In other words, the esterification reaction may not go to completion. The presence of such materials in the reaction mixture in no way interferes with the present invention.

There is no critical upper limit on the number of equivalents of polyhydric alcohol which can be employed in the esterification reaction. Thus, the equivalent ratio of acylating agent to polyhydric alcohol can be 1:1.5, 1:2, 1:3, 1:3.2, 1:4, 1:6, 1:7, 1:10, etc. Any volatile unreacted polyhydric alcohols can be removed from the reaction mixture by conventional techniques such as distillation or allowed to remain in the reaction mixture provided if they are soluble in the ester-containing first reaction mixture. Their presence, if they are oil-soluble at the concentration at which they are present, does not unduly interefere with the use of the final oil-soluble compositions. Clearly, however, based on stoichiometric considerations, there is generally no purpose in employing polyhydric alcohol reactants in amounts such that there is more than about one mole of polyhydric alcohol for each equivalent of acylating agent unless the excess alcohol reactant is for the purpose of shifting the reaction equilibrium or serves as a diluent.

If desired, the esterification process can be conducted in the presence of substantially inert organic liquid diluents. The presence of the diluent can facilitate temperature control and the mixing of the reactants. If a diluent is selected which will form an azeotrope with water, the diluent assists in the removal of water. Suitable diluents include, for example, the normally aliphatic, cycloaliphatic, and aromatic hydrocarbons and the corresponding halogenated hydrocarbons, particularly chlorinated hydrocarbons, such as benzene, toluene, xylene, chlorobenzene, hexane, heptane, cyclohexane, mineral oil, mixtures thereof, and the like. Ethers, ketones, sulfones, etc., can also be used. Of course, where the alcoholic reactants are liquids at the reaction temperature, the alcohols can serve as diluents and as mentioned above, it may be desirable to employ excesses of the polyhydric alcohol reactant in order that the excess can function as a diluent.

The esterification conditions contemplated by the present invention are those normally used in the preparation of carboxylic acid esters. The reactants are generally heated at a temperature of at least about 100° C. up to about 300° C. and preferably at a temperature between about 150° C. and 250° C. Conventional esterification catalysts may be used to promote the esterification reaction. Illustrative catalyst include sulfuric acid, pyridine hydrochloride, hydrochloric acid, benzene sulfonic acid, p-toluene sulfonic acid, phosphoric acid, and other known esterification catalysts. The catalyst, if present, can be employed in amount of from about 0.01% to about 5% by weight based on the total weight of the reactants. Sometimes it is helpful to blow dry inert gases (e.g., nitrogen) through the reacting materials to assist in the removal of water.

As suggested above, the acylating agent can be the carboxylic acid per se, the corresponding anhydride, the acyl halides, or other conventional acylating forms of carboxylic acids. Generally, the carboxylic acid or its anhydride will be employed. As is obvious to those skilled in the art, a lower alkyl ester could be used as an acylating agent in a transesterification reaction.

However, processes for preparing carboxylic acid esters of polyhyrdic alcohols are well known and no further description of these conventional esterification conditions are necessary. For example, detailed discussion and examples of esterification conditions suitable for preparing the oil-soluble composition of this invention is found in U.S. Pat. 3,381,022 which has been incorporated herein.

After the formation of the first reaction mixture, this mixture is contacted with from about 0.025 to about .15 equivalent of at least one hydroxy-substituted primary amine per equivalent of substituted carboxylic acid acylating agent employed in the formation of the ester-containing first reaction mixture. The number of equivalents contained in a hydroxy-substituted primary amine is based on the number of primary amino groups present. That is, the hydroxy-substituted aliphatic primary amines have an equivalent weight corresponding to their molecular weight divided by the number of primary amino substitutents contained therein. Thus, ethanolamine, glucamine, trismethylolaminomethane each have one equivalent per mole while 1,3-diamine-2-hydroxy-propane has two equivalents per mole.

The hydroxy-substituted aliphatic primary amines can be contacted with the first reaction mixture as it is upon completion of the esterification step or after the first reaction mixture is subjected to desired purification techniques. For example, the first reaction mixture may be filtered before contacting it with the hydroxy-substituted primary amines. Similarly, unreacted polyhydric alcohols and diluents may be removed if desired. Likewise, the first reaction mixture may be stripped at reduced pressure to remove substantially all water and other volatiles present. Blowing the reaction mixture with dry inert gases such as nitrogen, helium, and the like also assist in removing water. However, it is not necessary that any of these purification techniques be applied to the first reaction mixture before it is contacted with the hydroxy-substituted aliphatic primary amine. The application of any of the desired purification techniques may be postponed until after completion of the contacting of the first reaction mixture with the primary amine.

The hydroxy-substituted primary amine and the first-reaction mixture are generally contacted at temperatures ranging from about 25° C. up to the decomposition temperature of the reactant having the lowest decomposition point. Generally, however, the primary amine will be contacted with the first reaction mixtures at temperatures in the range of about 25° C. up to about 300° C. and preferably at temperatures of about 100° C. up to about 250° C. The time for contacting the ester-containing first reaction mixture with the aliphatic primary amine will vary with the amount of materials employed, the specific reactants involved, the temperature, and the like. However, good results can be obtained by contacting the aliphatic primary amine with the first reaction mixture for a period of time varying from about 0.1–10.0 hours. Optimum duration of contact for a given combination of ester-containing first reaction mixture, hydroxy-substituted primary amine, and temperature can be easily ascertained within this range.

As with the esterification step, the contacting of the first reaction mixture with the hydroxy-substituted aliphatic primary amine can be conducted in the presence of a substantially inert organic liquid diluent of the type enumerated hereinabove. Upon completion of the step of contacting the first-reaction mixture with the hydroxy-substituted aliphatic primary amine, it is contemplated that the resulting reaction mass can be subjected to conventional purification techniques such as filtration, distillation, decantation, centrifugation, and the like.

The oil-soluble compositions contemplated by the present invention is the mixture of oil-soluble materials present in the final reaction mass after completion of the contacting of the ester-containing first reaction mixture with the hydroxy-substituted primary amine either before or after the application of conventional purification techniques to said mass. The specific nature of these compositions is not clearly understood. Nor is the manner in which the primary amines improve the final products clear. For these reasons, the oil-soluble compositions of this invention are best described in terms of their process of preparation.

The following examples illustrate preferred embodiments of the processes and the oil-soluble compositions of this invention. Unless otherwise indicated, all percentages and "parts" used in the examples and elsewhere in the specification and claims refer to "percent by weight" and "parts by weight."

EXAMPLE 1

A mixture of 1,512 (2.7 equivalents) parts of polyisobutenyl-substituted succinic anhydride (prepared by reacting chlorinated polyisobutylene with maleic anhydride according to known procedures described hereinbefore) and 184 parts (5.4 equivalents) of pentaerythritol is heated at 200–212° C. for about eight hours while blowing nitrogen gas therethrough to aid in water removal. To this ester-containing first reaction mixture, there is added 1,383 parts of low viscoscity mineral oil as a diluent. Then 22 parts (0.18 equivalent) of trismethylolaminomethane (i.e., $H_2N-C-(CH_2OH)_3$) is added to the oil-diluted first reaction mixture over a 0.5-hour period while maintaining a temperature of about 160° C. The temperature is increased to about 200–210° C. for about two hours and the resulting reaction mass is subsequently filtered at about 160° C. The filtrate is a 45% oil solution of an especially preferred oil-soluble composition illustrative of this invention.

Following the general procedure of Example 1, other oil-soluble compositions representative of those contemplated as being within the scope of the present invention are prepared by reacting the acylating agents, polyhydric alcohols, and hydroxy-substituted primary amines in the amounts indicated in Table I.

TABLE I.—REACTANTS AND AMOUNTS FOR FOLLOWING EXAMPLES

| Example No | Acylating agent (A) | Polyhydric alcohol (B) | Hydroxy-substituted primary amine (C) | Equivalent ratio of (A):(B):(C) |
|---|---|---|---|---|
| 2 | Polyisobutenyl-substituted succinic anhydride (560*). | Pentaerythritol | N-(β-hydroxyethyl)-ethylene diamine. | 1:2:0.067 |
| 3 | Polyisobutenyl-substituted succinic anhydride (850*). | Sorbitol | Glucamine | 1:3:0.03 |
| 4 | Polyisobutenyl-substituted succinic anhydride (1100*). | Mannitol | 1,3-diamino-2-hydroxy-propane. | 1:4:0.035 |
| 5 | Polyisobutenyl-substituted succinic anhydride (550*).[1] | Pentaerythritol | Trismethylolaminomethane | 1:1:0.12 |
| 6 | Polypropylene-substituted succinic anhydride (800*). | Trimethylolethane | 2-amino-1-Butanol-ethanol-amine mixture (equimolar mixture). | 1:2:0.025 |
| 7 | Polyisobutenyl-substituted succinic anhydride (1500*). | Glycerol-sorbitol mixture.[3] | 2-amino-2-methyl-1,3-propanediol. | 1:2:5:0.07 |
| 8 | Poly(1-hexene)-substituted tricarboxylic acid (720*).[2] | Erythritol | N-(β-hydroxypropyl)-N'-(β-aminoethyl)-piperazine. | 1:1.5:0.075 |
| 9 | Polyisobutenyl-substituted succinic anhydride (900*) and polyproplene-substituted succinic anhydride (350*). | 1,2,6-hexanetriolpentaerythritol mixture (2:1 molar ratio). | 2-amino-2-ethyl-1,3-propanediol. | 1:3:0.032 |
| 10 | Polyisobutenyl-substituted succinic anhydride (260*). | Glycerol | p-(β-hydroxyethyl)-aniline | 1:2:0.05 |
| 11 | Polyisobutenyl-substituted succinic anhydride (610*). | Trimethylolpropane | Trismethylolaminomethane | 1:3:0.005 |
| 12 | Polyisobutenyl-substituted succinic anhydride (560*). | Polypropylene glycol (avg. M.W.-400). | 3-amino-1-propanol | 1:2:0.15 |
| 13 | Polyisobutenyl-substituted succinic anhydride. | β,β'-Dihydroxyethyl sulfide. | 2-amino-6-methyl-6-heptanol | 1:2:0.04 |

[1] This is a polyisobutene having an average of about two succinic anhydride substituents per polyisobutene group prepared by reacting polyisobutene having an average molecular weight of about 2000 with maleic acid in a molar ratio of about 1:2 in the presence of chlorine according to the general procedure described in U.S. Patents. 3,215,707 and 3,231,587.
[2] Prepared by reacting brominated poly(1-hexene) with 2-pentene-1,3,5-tricarboxylic acid according to the procedure discussed and illustrated in U.S. Patent. 3,272,746.
[3] Equimolar mixture.

Note.—*Number in parentheses indicates average equivalent weight of acylating agent.

Generally, the improved oil-soluble compositions of this invention, such as those illustrated by the foregoing specific examples, can be used in fuels and lubricants alone or in combination with other conventional additives in the same manner and concentrations as the esters of the prior art represented by the above-incorporated patents. When employed as sludge-dispersing additives for lubricants the oil-soluble compositions can be used in amounts such that they comprise from about 0.01% to about 30% by weight of the lubricant depending on the use to which the lubricant is to be put and the presence or absence of other additives, especially dispersants or detergents. Ordinarily, they will comprise at least about 0.1% and up to about 10% by weight of the lubricant although, under unusually harsh operating conditions such as are encountered in certain diesel engines, amounts of 10%–30% are beneficially employed, particularly in the absence of other detergent or dispersant additive.

The oil-soluble compositions of this invention can be effectively employed in a variety of lubricating compositions based on diverse oils of lubricating viscosity such as a natural or synthetic lubricating oil, or suitable mixtures thereof. The lubricating compositions contemplated include principally crankcase lubricating oils for spark-ignited and compression-ignited internal combustion engines including automobile and truck engines, two-cycle engine lubricants, aviation piston engines, marine and railroad diesel engines, and the like. However, automatic transmission fluids, transaxle lubricants, gear lubricants, metal-working lubricants, hydraulic fluids, and other lubricating oil and grease compositions can benefit from the incorporation of the present additives.

Natural oils include animal oils and vegetable oils (e.g., castor oil, lard oil) as well as solvent-refined or acid-refined mineral lubricating oils of the paraffinic, naphthenic, or mixed paraffinic-naphthenic types. Oils of lubricating viscosity derived from coal or shale are also useful base oils. Synthetic lubricating oils include hydrocarbon oils and halo-substituted hydrocarbon oils such as polymerized and interpolymerized olefins (e.g., polybutylene, polypropylenes, propylene-isobutylene copolymers, chlorinated polybutylenes, etc.); alkyl benzenes (e.g., dodecylbenzenes, tetradecylbenzene, dinonylbenzenes, di-(2-ethylhexyl)benzenes, etc.); polyphenols (e.g., biphenyls, terphenyls, etc.); and the like. Alkylene oxide polymers and interpolymers and derivatives thereof where the terminal hydroxyl groups have been modified by esterification, etherification, etc., constitute another class of known synthetic lubricating oils. These are exemplified by the oils prepared through polymerization of ethylene oxide or propylene oxide, the alkyl and aryl ethers of these polyoxyalkylene polymers (e.g., methylpolyisopropylene glycol ether having an average molecular weight of 1000, diphenyl ether of polyethylene glycol having a molecular weight of 500–1000, diethyl ether of polypropylene glycol having a molecular weight of 1000–1,500, etc.) or mono- and polycarboxylic esters thereof, for example, the acetic acid esters, mixed $C_3$–$C_8$ fatty acid esters, or the $C_{13}$ Oxo acid diester of tetraethylene glycol. Another suitable class or synthetic lubricating oils comprises the esters of dicarboxylic acids (e.g., phthalic acid, succinic acid, maleic acid, azelaic acid, suberic acid, sebacic acid, fumaric acid, adipic acid, linoleic acid dimer, etc.) with a variety of alcohols (e.g., butyl alcohol, hexyl alcohol, dodecyl alcohol, 2-ethylhexyl alcohol, pentaerythritol, etc.). Specific examples of these esters include dibutyl adipate, di(2-ethylhexyl) sebacate, di-n-hexyl fumarate, dioctyl sebacate, diisooctyl azelate, diisodecyl azelate, dioctyl phthalate, didecyl phthalate, dieicosyl sebacate, the 2-ethylhexyl diester of linoleic acid dimer, the complex ester formed by reacting one mole of sebacic acid with two moles of tetraethylene glycol and two moles of 2-ethyl-hexanoic acid, and the like. Silicon-based oils such as the polyalkyl-, polyaryl-, polyalkoxy-, or polyaryloxy-siloxane oils and silicate oils comprise another useful class of synthetic lubricants (e.g., tetraethyl-silicate, tetraisopropyl-silicate, tetra(2-ethylhexyl)-silicate, tetra-(4-methyl-2-tetraethyl) - silicate, tetra-(p-tert-butyl-phenyl)-silicate, hexyl-(4 - methyl-2-pentoxy)-disiloxane, poly(methyl)-siloxanes, poly(methylphenyl) - siloxanes, etc.). Other synthetic lubricating oils include liquid esters of phosphorus-containing acids (e.g., tricresyl phosphate, trioctyl phosphate, diethyl ester of decane phosphonic acid, etc.), polymeric tetrahydrofurans, and the like.

The oil-soluble compositions of this invention are normally used in conjunction with other conventional lubricating oil additives of the type illustrated in the above-incorporated U.S. patents. The conventional additives include extreme pressure agents, metal containing detergents such as normal and basic oil-soluble alkaline earth metal phenates, petrosulfonates, and salicylates, viscosity index improving agents, oxidation inhibitors, antifoam agents, ashless dispersants, corrosion inhibitors, and the like. Typical examples of these conventional additives are set forth in the above incorporated patents.

In fuels, the oil-soluble compositions of the invention promote engine cleanliness by reducing or eliminating harmful deposits in the fuel system, engine, and exhaust system through their dispersant capabilities. They are primarily intended for use in the normally liquid petroleum distillate fuels, that is, the petroleum distillates which boil in the range characteristic of petroleum fuels such as gasolines, fuel oil, diesel fuels, aviation fuels, kerosene, and the like. When employed in fuels, they are generally employed in lower concentrations than in lubricants, for example, in amounts of from about 0.0001% to about 2% by weight and generally in amounts of from about 0.001% to about 0.5% by weight. As in the case of lubricants, other conventional fuel additives can be present in the fuel compositions contemplated herein. These conventional additives include lead scavengers, deicers, antiscreen clogging agents, neutral or basic oil-soluble alkaline earth metal sulfonates, phonates, or carboxylates, other ashless dispersants, demulsifiers, and the like. Illustrative fuel additives of the type which can be used in combination with those of the invention are disclosed in U.S. Pats. 3,223,495; 3,307,928; and ashless dispersants of the type disclosed in the above incorporated patents.

An example of the performance of the oil-soluble compositions of this invention and the intermediate complex ester-containing first reaction mixture is shown in Table II. This table records Ford MS Sequence VB engine test results of SAE 30 lubricating oil compositions which are the same except for the component being evaluated. Composition A contains about 3.9% by weight of a first reaction mixture containing 45% mineral oil produced according to Example 1 above. Composition B contains about 4.0% by weight of a final filtrate produced according to Example 1 also containing 45% diluent oil.

TABLE II.—FORD MS SEQUENCE VB TEST RESULTS

| | Overall sludge | Engine varnish | Piston varnish | Highest percent PCV plugging | Aug. blowby |
|---|---|---|---|---|---|
| Composition: | | | | | |
| A | 41.7 | 35.9 | 7.4 | 84 | 154 |
| B [1] | 41.6 | 39.4 | 7.7 | [2] 66 | 154 |

[1] Average of three tests unless otherwise indicated.
[2] Average of two tests.

From Table II, it is seen that Composition B was characterized by less engine varnish, piston varnish and PCV valve plugging without adversely affecting its sludge-dispersing capabilities (as shown by the sludge rating) and its blowby rating. It should be remembered that Component A is itself an unusually good additive with respect to the evaluated properties. Thus the test results demonstrate improvement in what is already a very effective additive.

The following are representative examples of lubricant and fuel compositions for the type contemplated by the present invention.

COMPOSITION A

SAE 10W-30 mineral lubricating oil containing 3.5% of the filtrate of Example 1, 0.08% of phosphorus as zinc di-n-octylphosphorodithioate, and 5% of the barium salt of an acid composition prepared by the reaction of 1000 parts of a polyisobutene having a molecular weight of 60,000 with 100 parts of phosphorus pentasulfide at 200° C. and hydrolizing the product with steam at 150° C.

COMPOSITION B

SAE 50 mineral lubricating oil containing 2.5% of the filtrate of Example 3 and 0.1% of phosphorus as the calcium salt of di-hexylphosphorodithioate.

COMPOSITION C

SAE 10W-40 mineral lubricating oil containing 4% of the filtrate of Example 2, 0.075% of phosphorus as the adduct of zinc di-cyclohexylphosphorodithioate treated with 0.3 moles of ethylene oxide per mole of phosphorodithioate, 2% of sulfurized sperm oil having a sulphur content of 10%, 3.5% of a poly-(alkylmethacrylate) viscosity index improver, 0.02% of a poly-(alkylmethacrylate) pour point depressant, and 0.003% of a poly-(alkylsiloxane) anti-foam agent.

COMPOSITION D

SAE 10W-40 mineral lubricating oil containing 6% of the product of Example 4, 0.1% of phosphorus as the zinc salt of a mixture of equal molar amounts of diisopropylphosphorodithioic acid and di-n-decylphosphorodithioic acid, and 2.5% of a sulfate ash as a basic barium detergent prepared by carbonating at 150° C. a mixture comprising mineral oil, barium di-dodecylbenzene sulfonate and 1.5 moles of barium hydroxide in the presence of a small amount of water and 0.7 mole of octylphenol according to conventional overbasing procedures.

COMPOSITION E

Gasoline containing 0.00035% of the product of Example 1.

COMPOSITION F

Diesel fuel containing 0.0025% of a filtrate according to Example 5.

COMPOSITION G

A diesel fuel containing 0.00015% of a product according to Example 8 and 0.1% of a basic barium sulfonate prepared by carbonating a mineral oil solution from mahogany acid and a 500% stoichiometric excess of barium hydroxide in the presence of heptylphenol as a promoter at 18° C. according to conventional techniques.

COMPOSITION H

Kerosene containing 0.05% of the filtrate of Example 7.

Other lubricants and fuels illustrative of those contemplated by this invention are readily prepared by replacing all or a portion of the oil-soluble compositions used in A–H with one or more of the other inventive oil-soluble compositions described herein.

What is claimed is:
1. A process for preparing oil-soluble compositions comprising reacting under esterification conditions (A) at least one substituted polycarboxylic acid acylating agent containing an average of at least about 30 aliphatic carbon atoms per substituent with (B) at least one polyhydric alcohol in amounts such that there is at least one equivalent of polyhydric alcohol for each equivalent of substituted carboxylic acid acylating agent to form an ester-containing first reaction mixture and thereafter intimately contacting this first reaction mixture with (C) from about .025 to about .15 equivalent of at least one hydroxy-substituted primary amine per equivalent of (A), wherein (A) is further characterized in that it is a substantially saturated acylating agent produced by reacting ethylenically unsaturated carboxylic acidic reactant of the formula

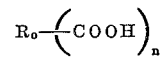

or the corresponding carboxylic acid halides, anhydrides, and esters where $R_o$ is characterized by the presence of at least one ethylenically unsaturated carbon-to-carbon covalent bond and $n$ is an integer of two to six, with an ethylenically unsaturated hydrocarbon or chlorinated hydrocarbon containing at least thirty aliphatic carbon atoms at a temperature within the range of 100°–300° C. with the proviso that said acylating agent may contain polar substituents to the extent that such polar substituents do not exceed 10% by weight of the hydrocarbon portion of the acylating agent excluding the weight of the carboxylic acid groups.

2. An oil-soluble composition prepared according to the process of claim 1.

3. An oil-soluble composition according to claim 2 wherein (A) is at least one substituted dicarboxylic acid acylating agent containing an average of at least about 50 aliphatic carbon atoms per substituent, (B) is at least one polyhydric aliphatic alcohol containing at least three hydroxyl groups and up to about 12 carbon atoms, and (C) is a polyhydroxy-substituted aliphatic primary amine containing up to about ten carbon atoms, wherein (A) is further characterized in that the acidic reactant contains an ethylenic linkage in an $\alpha,\beta$-position with respect to at least one carboxyl function in the $R_0$ group, the total number of carbon atoms in said acidic reactant does not exceed ten, and $n$ is two.

4. An oil-soluble composition according to claim 2 where said acidic reactant is selected from the class consisting of maleic acid and maleic anhydride and where said ethylenically unsaturated hydrocarbon and chlorinated hydrocarbon are selected from substantially saturated olefin polymers and the corresponding chlorinated polymers.

5. An oil-soluble composition according to claim 3 wherein (A) is at least one poly(1-monoolefin)-substituted succinic acid or anhydride wherein the poly(1-monoolefin)-substituent is characterized by an average molecular weight of about 700 to about 5000, (B) is at least one polyhydric lower alkanol having from 3 to 6 hydroxyl groups and up to seven carbon atoms and (C) is at least one polyhydroxy-substituted alkanolamine having up to about 10 carbon atoms.

6. An oil-soluble composition according to claim 5 wherein (A) is at least one polybutenyl-substituted succinic acid or anhydride, and (B) is at least one member selected from the group consisting of pentaerythritol, mannitol, sorbitol, trimethylolethane, and trimethylolpropane.

7. An oil-soluble composition according to claim 6 wherein (C) is trismethylolaminomethane.

8. A lubricant or fuel comprising, respectively, a major amount of a lubricating oil or a normally liquid petroleum distillate fuel and a dispersant amount of an oil-soluble composition according to claim 2.

9. A lubricant or fuel comprising, respectively, a major amount of a lubricating oil or a normally liquid petroleum distillate fuel and a dispersant amount of an oil-soluble composition according to claim 3.

10. A lubricant or fuel comprising, respectively, a major amount of a lubricating oil or a normally liquid petroleum distillate fuel and a dispersant amount of an oil-soluble composition according to claim 4.

11. A lubricant or fuel comprising, respectively, a major amount of a lubricating oil or a normally liquid petroleum distillate fuel and a dispersant amount of an oil-soluble composition according to claim 6.

12. A lubricant or fuel comprising, respectively, a major amount of a lubricating oil or a normally liquid petroleum distillate fuel and a dispersant amount of an oil-soluble composition according to claim 7.

References Cited

UNITED STATES PATENTS

| 3,184,474 | 5/1965 | Catto et al. | 252—51.5A |
| 3,210,283 | 10/1965 | Stuart et al. | 252—51.5A |
| 3,219,666 | 11/1965 | Norman et al. | 252—51.5A |
| 3,522,179 | 7/1970 | Le Suer | 252—51.5A |

DANIEL E. WYMAN, Primary Examiner

W. J. SHINE, Assistant Examiner

U.S. Cl. X.R.

44—63, 71; 260—268, 326.3, 326.5